(12) United States Patent
Janian

(10) Patent No.: US 11,085,491 B1
(45) Date of Patent: Aug. 10, 2021

(54) SELF LUBRICATING BEARING SLEEVE

(71) Applicant: Robert Janian, Encino, CA (US)

(72) Inventor: Robert Janian, Encino, CA (US)

(*) Notice: Subject to any disclaimer, the term of this patent is extended or adjusted under 35 U.S.C. 154(b) by 0 days.

(21) Appl. No.: 16/873,706

(22) Filed: Jun. 8, 2020

(51) Int. Cl.
  *F16C 23/02* (2006.01)
  *F16C 27/06* (2006.01)
  *F16C 33/20* (2006.01)
  *F16C 33/24* (2006.01)

(52) U.S. Cl.
  CPC ............ *F16C 33/201* (2013.01); *F16C 23/02* (2013.01); *F16C 27/063* (2013.01); *F16C 33/24* (2013.01); *F16C 2208/32* (2013.01); *F16C 2220/60* (2013.01); *F16C 2220/68* (2013.01); *Y10T 29/49668* (2015.01)

(58) Field of Classification Search
  CPC ........ F16C 23/02; F16C 25/02; F16C 27/063; F16C 33/201; F16C 33/22; F16C 2208/32; F16C 2220/60; F16C 2220/68; Y10T 29/49668
  USPC .... 384/192.2, 202, 276, 280, 282, 293, 300, 384/191.2, 222, 297; 29/898.07, 898.054, 29/898.059
  See application file for complete search history.

(56) References Cited

U.S. PATENT DOCUMENTS

| | | | | |
|---|---|---|---|---|
| 3,843,216 A | * | 10/1974 | Campbell | F16C 33/20 384/152 |
| 3,913,990 A | * | 10/1975 | Eklund | B23P 6/00 384/208 |
| 4,111,499 A | * | 9/1978 | McCloskey | F16C 23/045 384/192 |
| 4,290,626 A | * | 9/1981 | Sullivan, Jr. | B60G 13/006 267/35 |
| 4,351,383 A | * | 9/1982 | Gladwin | B22D 11/1287 164/442 |
| 5,267,798 A | * | 12/1993 | Budris | F16C 33/26 384/278 |
| 6,258,413 B1 | * | 7/2001 | Woelki | F16C 33/28 427/402 |
| 2012/0251021 A1 | * | 10/2012 | Swei | C09J 7/201 384/13 |
| 2012/0294557 A1 | * | 11/2012 | Soelch | B05D 1/38 384/282 |
| 2014/0272458 A1 | * | 9/2014 | Ruan | C25D 1/02 428/650 |
| 2018/0038002 A1 | * | 2/2018 | Tamura | C25C 7/08 |
| 2019/0339180 A1 | * | 11/2019 | Gu | G01N 3/08 |

FOREIGN PATENT DOCUMENTS

| | | | | | |
|---|---|---|---|---|---|
| CN | 106464013 A | * | 2/2017 | | H02J 7/0045 |
| CN | 103840268 B | * | 4/2017 | | |
| CN | 208565054 U | * | 3/2019 | | |
| DE | 102010053326 A1 | * | 8/2011 | | F16C 33/14 |
| FR | 2747948 A1 | * | 10/1997 | | B21B 27/005 |
| FR | 2958192 A1 | * | 10/2011 | | B60R 13/01 |
| KR | 970015783 A | * | 4/1997 | | C23C 18/22 |
| KR | 20040059733 A | * | 7/2004 | | H01L 21/28 |

(Continued)

*Primary Examiner* — Marcus Charles

(57) ABSTRACT

A bearing sleeve element comprising a thin sheet of metal like bronze or brass with "dog bone" shaped pattern cut out through metal sheet in combination with a thin sheet of Teflon compressed and trapped inside "dog bone" shaped cavities of metal sheet in order to serve as a low friction bearing between two sliding surfaces.

8 Claims, 7 Drawing Sheets

(56) References Cited

FOREIGN PATENT DOCUMENTS

| KR | 101550276 B1 * | 9/2015 | ................ B67C 3/26 |
| WO | WO-9946465 A1 * | 9/1999 | ............ E05D 7/0027 |
| WO | WO-2014001524 A1 * | 1/2014 | ............ C09J 127/18 |

* cited by examiner

SELF LUBRICATING BEARING SLEEVE

BACKGROUND OF THE INVENTION

This invention relates to utility type wheels and sliding fixtures using ball bearings and needle bearings which needs to be lubricated and maintained by industrial grade oils and grease, industrial oils and grease collect dust and grit resulting wear and failure, in addition to that industrial grade oils and grease are not environmentally friendly, my invention eliminate the need for industrial lubricants while increasing service life and minimize sliding friction force.

SUMMARY OF THE INVENTION

In accordance with the present invention, a thin sheet of metal like bronze or brass, a "dog bone" shaped pattern cut out through metal sheet, "dog bone" pattern is shaped like two circular cavities interconnected to each other by a channel such that the areas of each circular cavity and interconnected channel are equal to one another, in addition, a thin sheet of Teflon pressed and flown to occupy directly inside "dog bone" pattern cavities. In combination bearing sleeve assembly with metal sheet containing Teflon sheet inside "dog bone" cavities could be flexed and turn to cylindrical shape in order to be installed between a rotating shaft and a housing bore like in trolleys and pulleys.

BRIEF DESCRIPTION OF THE INVENTION

Having thus described the invention in general terms, references will now be made to the description below taken in conjunction with the accompanying drawings wherein:

Figure 3:
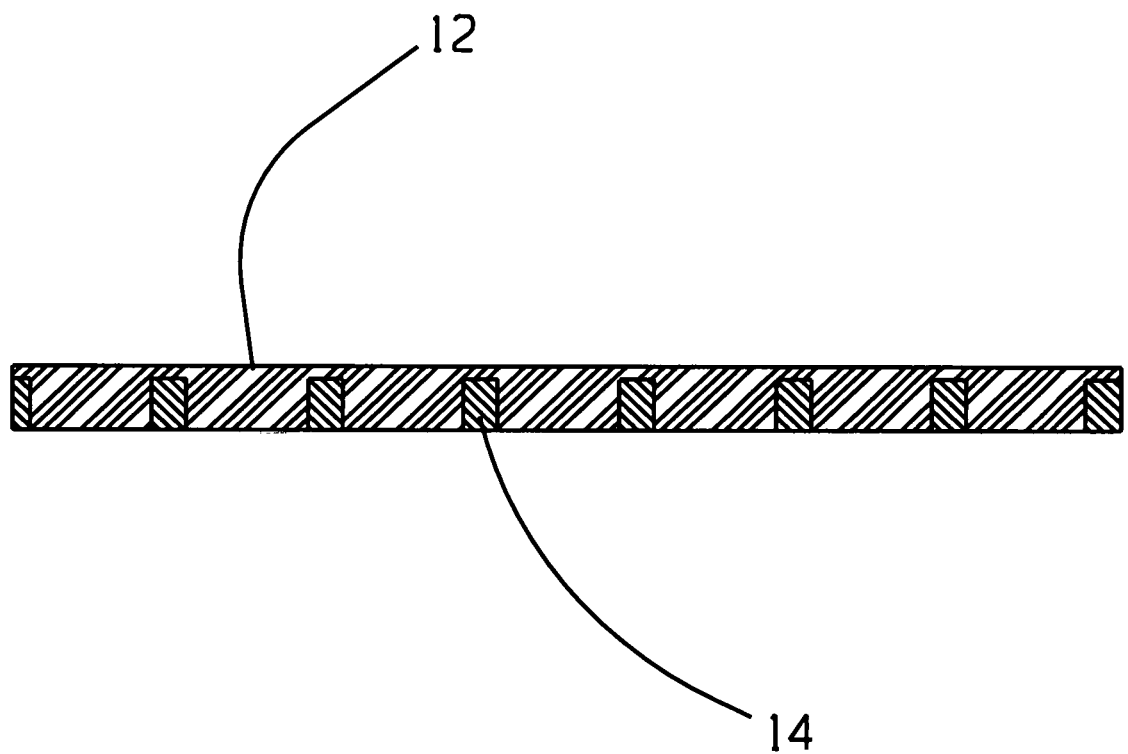

FIG. 3 is cross sectional view of Teflon sheet 12 pressed over metal sheet 14 in order to occupy inside "dog bone" cavities of metal sheet 14.

Figure 4:
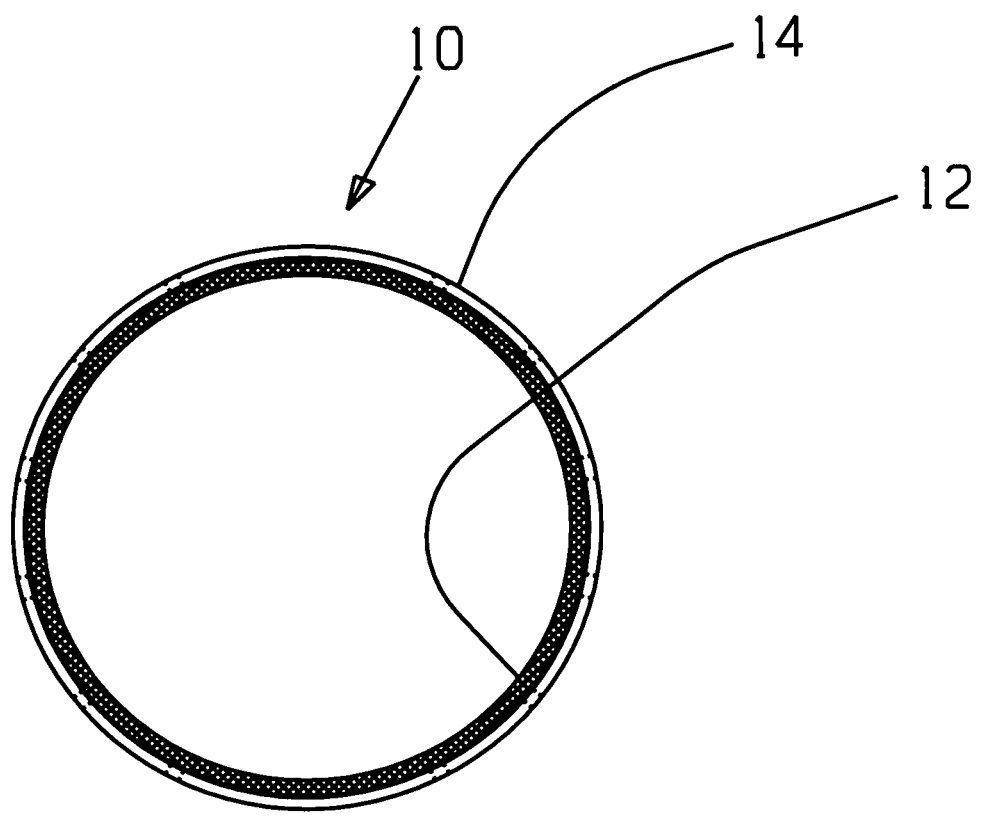

FIG. 4 shows bearing sleeve 10 turned circular such that Teflon sheet faces against rotating shaft and housing.

Figure 5:
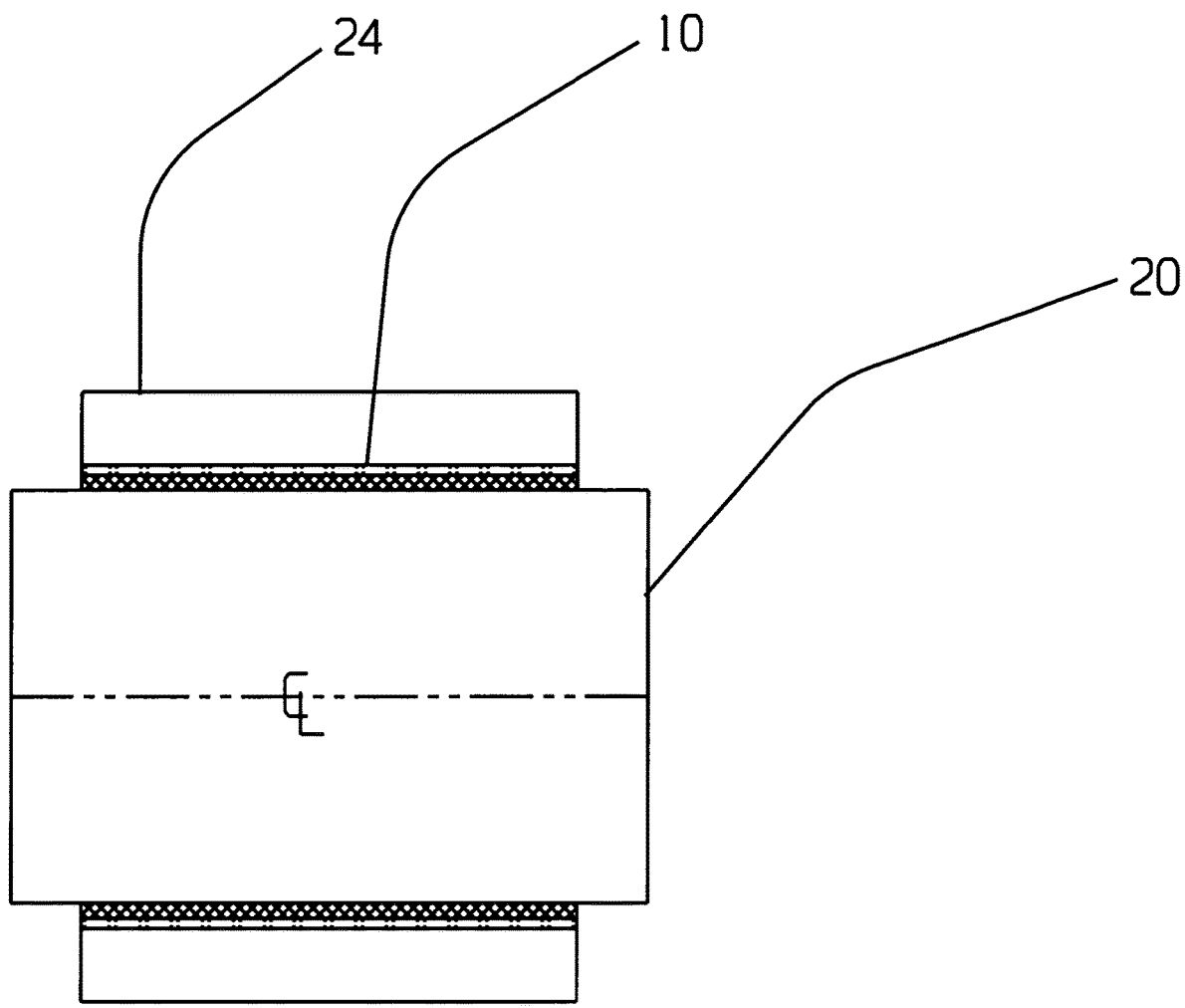

FIG. 5 is bearing sleeve 10 installed between rotating shaft and housing.

DETAILED DESCRIPTION OF THE INVENTION

Figure 1:
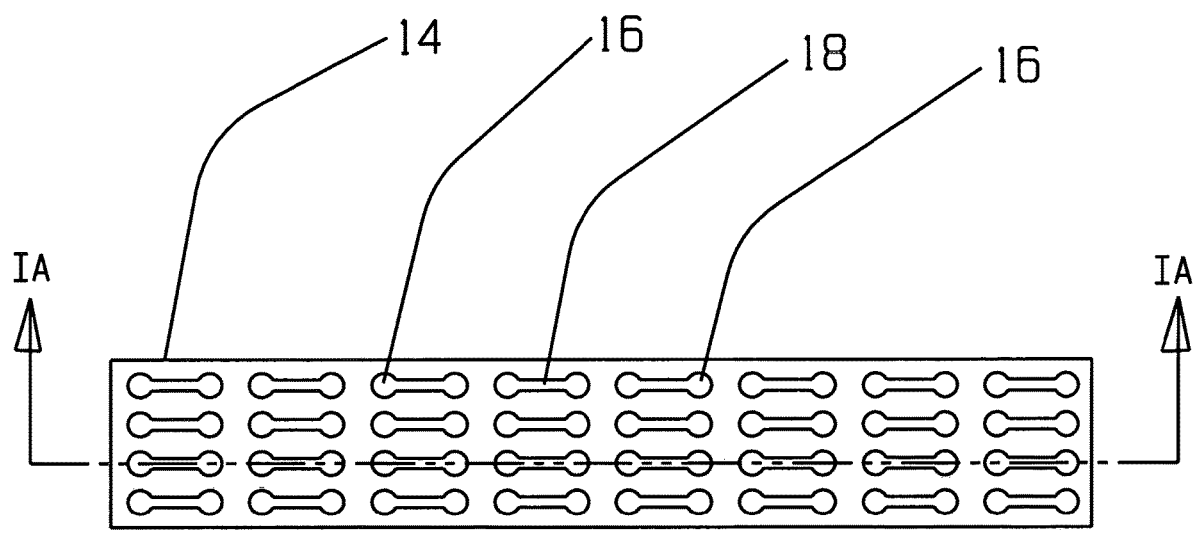
FIG. 1A is cross sectional view of metal sheet 14 in FIG. 1 containing "dog bone" shape cut out cavities.
Figure 1A:
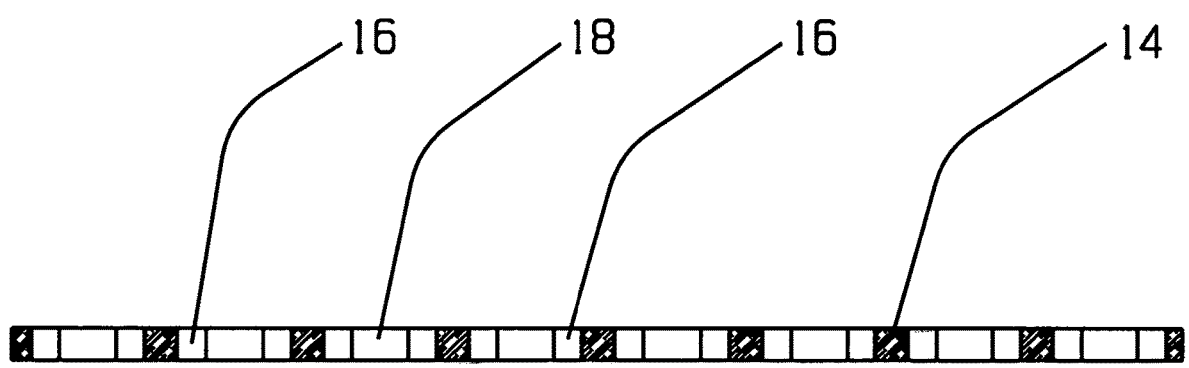
Figure 2:
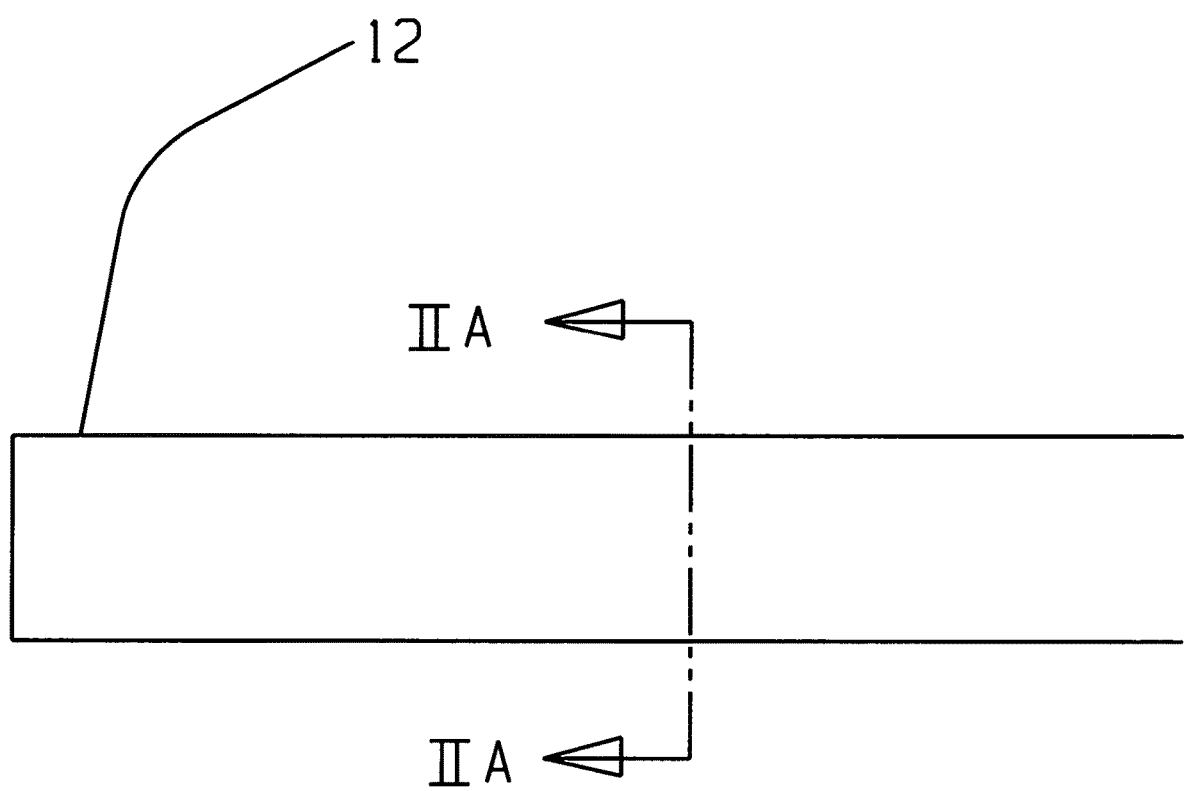
FIG. 2 is top view of Teflon sheet 12.
Figure 2A:
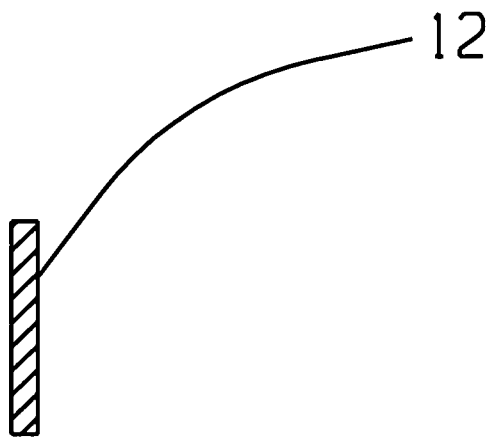
FIG. 2A is cross sectional view of Teflon sheet 12.

FIG. 1 is section of strip of metal sheet 14 with multiple cut out circular cavities of 16 and interconnected channel 18, areas of circular cavities 16 and interconnected channel 18 are equal to one another, metal sheet 14 is 0.004 inch to 0.010 inch thick. FIG. 1A shows cross sectional cut out view through cavities of 16 and 18 of metal sheet 14. FIG. 2 is top view of strip of Teflon sheet 12, Teflon sheet 12 is around 0.010 inch thick. FIG. 2A is cross sectional view IIA of 0.010 inch thick Teflon sheet 12. FIG. 3 shows cross sectional view of Teflon sheet 12 pressed and occupied inside "dog bone" cut out cavities of sheet metal 14. FIG. 4 is bearing sleeve 10 turned cylindrical with Teflon sheet 12 pressed into "dog bone" cavities of metal sheet 14 facing inside. FIG. 5 shows bearing sleeve 10 assembled between rotating shaft 20 and housing 24 bore. One of main characteristics of Teflon as a low friction material when exposed to pressure it moves and extrudes out through any gap or opening it is against, in order to let Teflon be allowed to move and be able to displace itself without moving completely away as it is pressured between dynamic surfaces my patent makes it possible for Teflon be able to move and reciprocate back and forth from one pool cavity 16 to another through interconnected channel 18 without being completely extrude and creep away, also with "dog bone" shaped cavities with two circular pools interconnected by an equal area channel 18 minimizes stress forces acting on metal sheet 14.

What is claimed is:

1. A bearing sleeve arrangement element, comprising:
   a thin metallic sheet made up from a bronze or brass material, which includes of a plurality of cutout dog-bone shaped cavity patterns;
   a Teflon sheet having the same surface area of metallic sheet, is pressed over a first surface of the metallic sheet such that portions of the Teflon material is inserted in the dogbone shape cavity patterns to be flushed with a second opposite surface of the sheet metallic material to form a sliding surface.

2. The bearing sleeve arrangement of claim 1, wherein the cutout dogbone shape cavity pattern consists of two circular cavities interconnected to each other by a straight recessed channel.

3. The bearing sleeve arrangement of claim 2, wherein an1 area of each circular cavities and straight channel are equal to one another.

4. The bearing sleeve arrangement of claim 1, wherein the metallic material has a thickness of about 0.004 to 0.010 inches.

5. The bearing sleeve arrangement of claim 1, wherein the Teflon sheet is pressed over the metal sheet so as to occupy inside dogbone shaped cavities.

6. The bearing sleeve arrangement of claim 1, wherein the bearing sleeve is cylindrical.

7. The bearing sleeve arrangement in claim 6, wherein the cylindrical bearing sleeve is installed between a rotating shaft and a housing bore.

8. The bearing sleeve arrangement of claim 7, wherein the Teflon sheet faces against a dynamic surface.

* * * * *